United States Patent
Sutskover et al.

(10) Patent No.: US 7,702,023 B2
(45) Date of Patent: Apr. 20, 2010

(54) TRANSMITTER OPERATIONS FOR INTERFERENCE MITIGATION

(75) Inventors: Ilan Sutskover, Hadera (IL); David Ben-Eli, Modiin (IL)

(73) Assignee: Marvell World Trade Ltd., St. Michael (BB)

( * ) Notice: Subject to any disclaimer, the term of this patent is extended or adjusted under 35 U.S.C. 154(b) by 1815 days.

(21) Appl. No.: 10/749,693

(22) Filed: Dec. 29, 2003

(65) Prior Publication Data

US 2005/0141597 A1 Jun. 30, 2005

(51) Int. Cl.
*H04K 1/10* (2006.01)
(52) U.S. Cl. ............ 375/260; 370/342; 370/343; 370/345; 370/351; 375/144; 375/148; 375/E1.029; 329/320
(58) Field of Classification Search ............ 375/130, 375/140, 146; 370/342; 455/522
See application file for complete search history.

(56) References Cited

U.S. PATENT DOCUMENTS

| | | | | |
|---|---|---|---|---|
| 5,956,332 A * | 9/1999 | Rasanen et al. | ............ | 370/342 |
| 6,144,860 A * | 11/2000 | Komatsu | ............ | 455/522 |
| 6,647,067 B1 * | 11/2003 | Hjelm et al. | ............ | 375/260 |
| 6,665,288 B1 | 12/2003 | Ottosson et al. | | |
| 2002/0071407 A1 * | 6/2002 | Koo et al. | ............ | 370/335 |
| 2003/0104808 A1 * | 6/2003 | Foschini et al. | ............ | 455/423 |
| 2004/0028121 A1 * | 2/2004 | Fitton | ............ | 375/144 |
| 2004/0030979 A1 * | 2/2004 | Shany et al. | ............ | 714/752 |
| 2004/0052236 A1 * | 3/2004 | Hwang et al. | ............ | 370/342 |
| 2004/0101034 A1 * | 5/2004 | Ben-David et al. | ............ | 375/148 |
| 2004/0203640 A1 * | 10/2004 | Molander et al. | ............ | 455/414.1 |
| 2005/0018697 A1 * | 1/2005 | Enns et al. | ............ | 370/401 |
| 2005/0043031 A1 * | 2/2005 | Cho et al. | ............ | 455/450 |
| 2005/0123004 A1 * | 6/2005 | Lechleider et al. | ............ | 370/529 |
| 2005/0221833 A1 * | 10/2005 | Granzow et al. | ............ | 455/450 |
| 2006/0159262 A1 * | 7/2006 | Guillemot et al. | ............ | 380/210 |
| 2006/0166690 A1 * | 7/2006 | Nishio et al. | ............ | 455/522 |

OTHER PUBLICATIONS

Caire, Giuseppe, et al., "On the Achievable Throughput of a Multiantenna Gaussian Broadcast Channel", *IEEE Transactions on Information Theory*, vol. 49, No. 7, (Jul. 2003), pp. 1691-1706.
Caire, Giuseppe, et al., "On the Multiple Antenna Broadcast Channel", *36th Asilomar Conference on Signals, Systems and Computers*, (Nov. 2001), 6 pages.
Costa, Max H., "Writing on Dirty Paper", *IEEE Transactions on Information Theory*, vol. IT-29, No. 3, (May 1983), pp. 439-441.
Erez, Uri, et al., "Capacity and Lattice-strategies for Cancelling Known Interference", *ISITA 2000*, Honolulu, Hawaii, (Nov. 2000), 5 pages.

(Continued)

*Primary Examiner*—David C Payne
*Assistant Examiner*—Adolf Dsouza (57) ABSTRACT

Interference mitigation strategies are presented for use within a transmitter in a wireless system. In at least one embodiment, one or more transmit signals may be generated that are capable of suppressing common channel interference effects within an associated receiver. In other embodiments, one or more transmit signals may be generated that are capable of suppressing dedicated channel interference effects within an associated receiver.

37 Claims, 7 Drawing Sheets

OTHER PUBLICATIONS

Barreto, A. N., et al., "Capacity Increase in the Downlink of Spread Spectrum Systems Through Joint Signal Precoding", *IEEE International Conference on Communications, Conference record*, vol. 1 of 10, ISBN: 0-7803-7097-1, (Jun. 11, 2001), 1142-1146.

Esmailzadeh, R., et al., "Pre-Rake Diversity Combination for Direct Sequence Spread Spectrum Communications Systems", *Proceedings of the International Conference on Communications(ICC), IEEE; 3*, ISBN: 0-7803-0950-2,(May 23, 1993), 463-467.

Georgoulis, S. L., et al., "Transmitter Based Inverse Filters for MAI and ISI Mitigation in a TDD/CDMA Downlink", *IEEE 56th Vehicular Technology Conf. Proceedings*, vol. 1 of 4, VTC 2002-Fall 2002, ISBN: 0-7803-7467-3, (Sep. 24, 2002), 681-685.

Schubert, M., et al., "Joint 'Dirty Paper' Pre-Coding and Downlink Beamforming", *IEEE 7th International Symposium on Spread Spectrum Techniques and Applications, 7*, ISBN: 0-7803-7627-7,(Sep. 2, 2002,536-540.

International Search Report and Written Opinion from corresponding International Application No. PCT/US2004/043039, mailed Apr. 22, 2005, 15 pages.

\* cited by examiner

┌─────────────────────────────────────────┐ ╱92
│ PERFORM AN LQ DECOMPOSITION OF THE      │
│ CHANNEL MATRIX H                        │
└─────────────────────────────────────────┘
                    │
                    ▼
┌─────────────────────────────────────────┐ ╱94
│ EVALUATE VARIABLES {x'$_i$} USING DATA  │
│ SYMBOLS v, L MATRIX, AND KNOWN          │
│ INTERFERENCE                            │
└─────────────────────────────────────────┘
                    │
                    ▼
┌─────────────────────────────────────────┐ ╱96
│ EVALUATE VARIABLES {x$_i$} USING VARIABLES │
│ {x'$_i$} AND Q MATRIX                   │
└─────────────────────────────────────────┘

Fig. 8 though the underlying code is a code that is used by the transmitter to transmit signals to the user devices. The transmitter may transmit a signal to any one of the wireless user devices.

TRANSMITTER OPERATIONS FOR INTERFERENCE MITIGATION

FIELD OF THE INVENTION

The invention relates generally to wireless communications and, more particularly, to interference mitigation techniques and structures for use within wireless systems.

BACKGROUND OF THE INVENTION

In wireless systems where a transmitter may be called upon to transmit information to a plurality of different user devices simultaneously (e.g., a cellular system where a base station transmits to multiple user devices within a cell, a wireless network where an access point transmits to multiple clients within a service area, etc.), interference cancellation has traditionally been performed, if at all, within the user devices. However, user devices in such systems often have limited computational resources and energy resources. Therefore, it may be desirable that at least some of the computational burden and energy dissipation associated with the interference cancellation function be moved to the transmitter in such systems.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
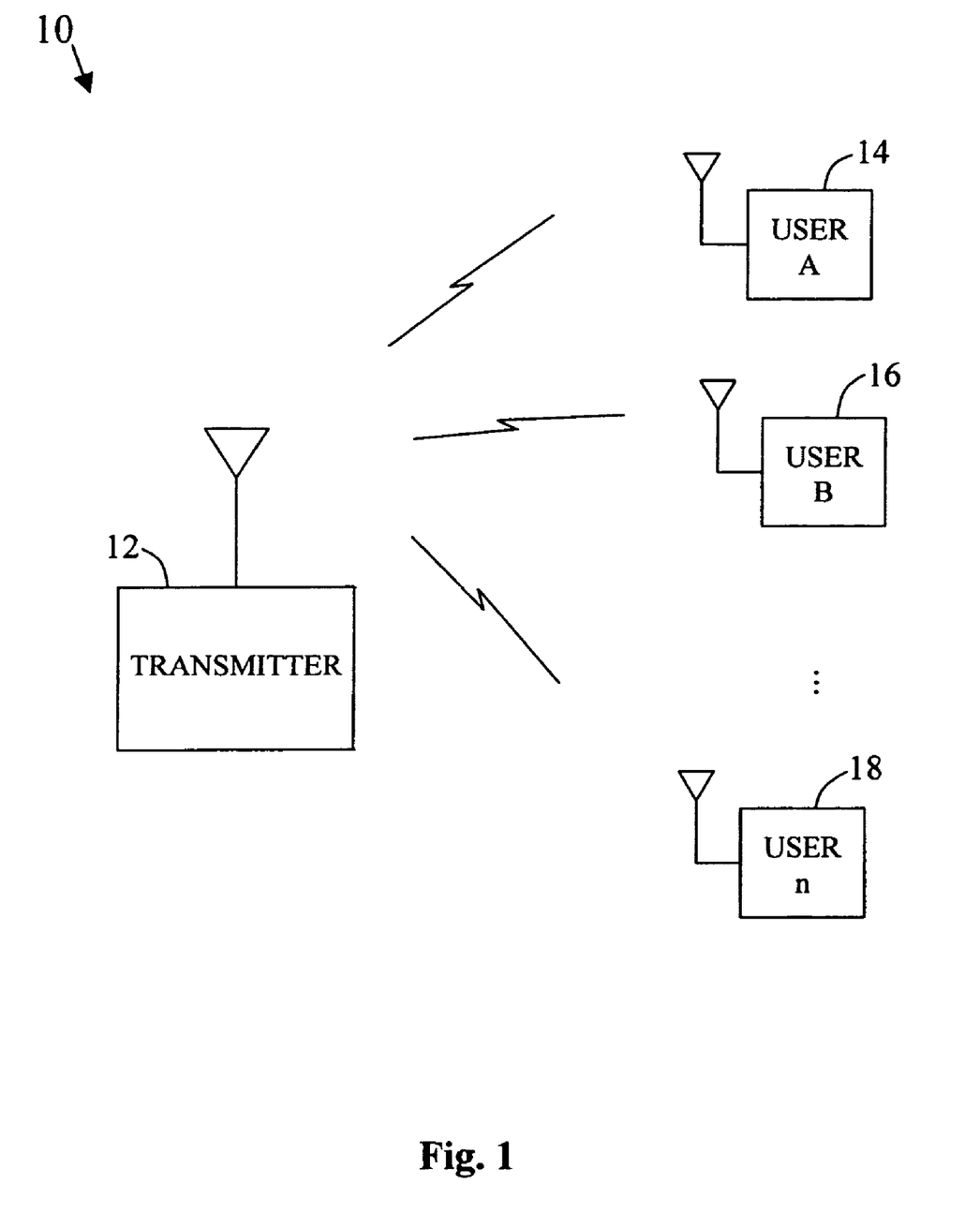
FIG. 1 is a block diagram illustrating an example wireless arrangement in accordance with an embodiment of the present invention.

FIG. 1 is a block diagram illustrating an example wireless arrangement 10 in accordance with an embodiment of the present invention. As illustrated, the wireless arrangement 10 may include a wireless transmitter 12 and a number of wireless user devices (USER A, USER B, ..., USER n) 14, 16, 18. The transmitter 12 may transmit a signal to any one of the wireless user devices 14, 16, 18 via a corresponding "dedicated" wireless channel (i.e., a wireless channel that is intended to deliver signals from the transmitter 12 to a specific user device). The transmitter 12 may also transmit a signal (or signals) to multiple wireless user devices simultaneously via one or more "common" channels. In a code division multiple access (CDMA) based system, one type of common channel may be the pilot channel, another type of common channel may be the paging channel, etc. The wireless arrangement 10 may represent, for example, a portion of a cellular system where the transmitter 12 is part of a base station and the user devices 14, 16, 18 (which may include, for example, cellular telephones, pagers, etc.) are associated with users within a coverage area (or cell) of the base station. In another example, the wireless arrangement 10 may represent a portion of a wireless network where the transmitter 12 is part of a wireless access point and the user devices 14, 16, 18 (e.g., computers or personal digital assistants (PDAs) with wireless networking capabilities, etc.) are associated with clients within a basic service area of the access point. Other implementations also exist. Any number of user devices may be serviced by the transmitter 12 at a particular time.

Any of a variety of techniques, or a combination of different techniques, may be used to define the different channels within the wireless arrangement 10 of FIG. 1. In at least one embodiment, for example, CDMA is used (either alone or in combination with one or more other multiple access techniques) to define the channels. CDMA is a multiple access technique in which a plurality of substantially orthogonal codes (usually taking the form of pseudo-random noise sequences) are used to spread spectrum modulate user signals within the system. Each modulated user signal may have an overlapping frequency spectrum with other modulated user signals in the system. However, because the underlying modulation codes are substantially orthogonal, it is possible to demodulate individual user signals by performing, for example, a correlation operation using an appropriate code. Thus, in the wireless arrangement 10 of FIG. 1, a first orthogonal code may be used to define a dedicated channel for the first user device 14, a second orthogonal code may be used to define a dedicated channel for the second user device 16, and so on. The wireless user devices 14, 16, 18 will each know their associated code for use in receiving signals from the corresponding dedicated channel. Each common channel may also have a corresponding orthogonal code. Each of the wireless user devices 14, 16, 18 may know the code(s) of the common channel(s).

As described above, in a CDMA-based system, various signals, including both dedicated signals and common signals, may have overlapping frequency spectrums. Sometimes, the orthogonality of the codes that are used to spread spectrum modulate the various signals is partially lost in the channel (e.g., when multi-path effects are experienced within the channel). When this occurs, the signals that have overlapping frequency spectrums with a desired signal may appear as interference when trying to demodulate the desired signal. For example, a common channel signal that is received in a receiver may appear as interference when attempting to demodulate a dedicated channel signal in the receiver. It is desirable that such interference be mitigated.

In at least one embodiment of the present invention, as will be described in greater detail, common channel interference that is affecting communication within a dedicated channel is mitigated by actions taken primarily in the transmitter. One technique that may be used in this regard is known as "dirty paper cancellation." As used herein, the phrase "dirty paper cancellation" refers to a class of techniques that provide for cancellation of known interference from the transmitter side by appropriate generation of a transmit signal, usually involving the performance of a modulo lattice operation. In one generalized approach, dirty paper cancellation may be described as follows. In a receiver, suppose that a signal is received that has the form:

$$y=x+I+n$$

where x represents the originally transmitted symbols, I represents interference, and n is a noise vector. If the interference I is known in the transmitter before transmission, it can be shown that by appropriately forming a transmit signal using the interference I, the interference component in the received signal may be reduced or cancelled. For example, if the signal $x=(v-\alpha I) \mod \Lambda$ is transmitted into a channel (where v are the clean transmit symbols, $\alpha$ is a constant, and $\Lambda$ is a lattice) and y is the signal received from the channel, then $y'=(\alpha y) \mod \Lambda$ may be determined within the receiver and the equivalent channel may be expressed as $y'=(v+w) \mod \Lambda$ (where w is an independent noise). By performing a modulo lattice operation in the receiver, the modulo sum of the symbols v and the noise w is achieved. The symbols v may then be recovered from the noise w without having to deal with the interference I. Such a technique is described in the paper "Capacity and Lattice-Strategies for Canceling Known Interference" by Erez et al., ISITA 2000, Honolulu, Hi., USA, November 2000.

To apply dirty paper techniques to the cancellation of common channel interference, it may first be assumed that the channel model associated with a user device can be expressed as follows:

$$y=Hd+Gc+n \quad \text{[Equation 1]}$$

where y is a vector of received symbols within the user device, d is a vector of transmitted dedicated symbols, c is a vector of transmitted common channel symbols, n is a noise vector, H is the channel gains matrix toward dedicated channels, and G is the channel gains matrix toward common channels. It is assumed that the H and G matrices are known within the transmitter 12. In at least one embodiment, the user devices 14, 16, 18 may transmit this channel information to the transmitter 12 (e.g., at predetermined times, in response to request, etc.). The channel information does not have to include full channel descriptions but may instead include partial descriptions or approximations.

Figure 2:
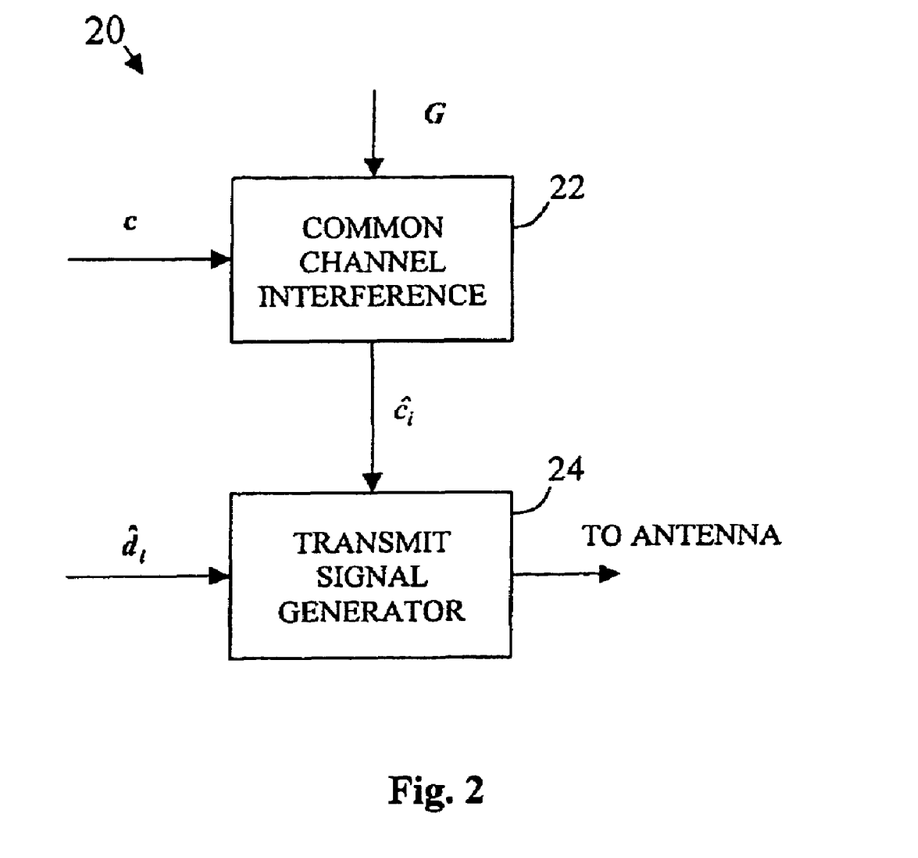
FIG. 2 is a block diagram illustrating an example processing arrangement for use within a transmitter in accordance with an embodiment of the present invention.

FIG. 2 is a block diagram illustrating an example processing arrangement 20 that may be used within the transmitter 12 of FIG. 1 to generate a transmit signal for transmission to a specific user device via a dedicated channel in accordance with an embodiment of the present invention. As shown, the arrangement 20 may include a common channel interference unit 22 and a transmit signal generator 24. The common channel interference unit 22 calculates the common channel interference that will occur at the output of the receiver of the ith user device assuming no interference mitigation is used. In at least one embodiment, the common channel interference is calculated as follows:

$$\hat{c}_i = (Gc)_i \quad \text{[Equation 2]}$$

where $\hat{c}_i$ is the common channel interference at the output of the receiver of the ith user device, c is the vector of transmitted common channel symbols, and G is the channel gains matrix toward common channels. The transmit signal generator 24 then uses the common channel interference information along with the clean data symbols ($\tilde{d}_i$) associated with the ith user device to generate a transmit signal for the ith user device that will result in reduced or cancelled interference. The transmit signal may then be delivered to an antenna for transmission to the user device. Any form of antenna or antennas may be used including, for example, a dipole, a patch, a helix, an array, and/or others, including combinations of the above. Intermediate processing elements may also exist between the transmit signal generator 24 and the antenna.

In at least one embodiment, the transmit signal for the ith user device is calculated as:

$$d_i = \alpha_i \lfloor (\tilde{d}_i - \hat{c}_i) \mod \Lambda \rfloor \quad \text{[Equation 3]}$$

where $\alpha_i$ is a constant that depends upon the residual interference+noise level and the power allocated to the ith user, $\Lambda$ is a lattice, and mod $\Lambda$ is the modulo lattice operation. In one approach, $\alpha_i$ may be calculated as follows:

$$\alpha_i = \frac{1}{H_{ii}} \left( \frac{H_{ii}^2 P_i}{H_{ii}^2 P_i + \sigma_i^2} \right)$$

where $P_i$ is the power allocated to the ith user device, $\sigma_i^2$ is the variance of the noise+residual interference, and $H_{ii}$ is the channel gain associated with the signal designed for the ith user as received by the ith user (and $H_{ij}$ would be the channel gain associated with the signal designed for the jth user as received by the ith user). Other techniques for calculating $\alpha_i$ may alternatively be used. One or more transmit signals may be generated in the above manner for each user device (i.e., for each dedicated channel) being supported by the transmitter 12.

Figure 3:
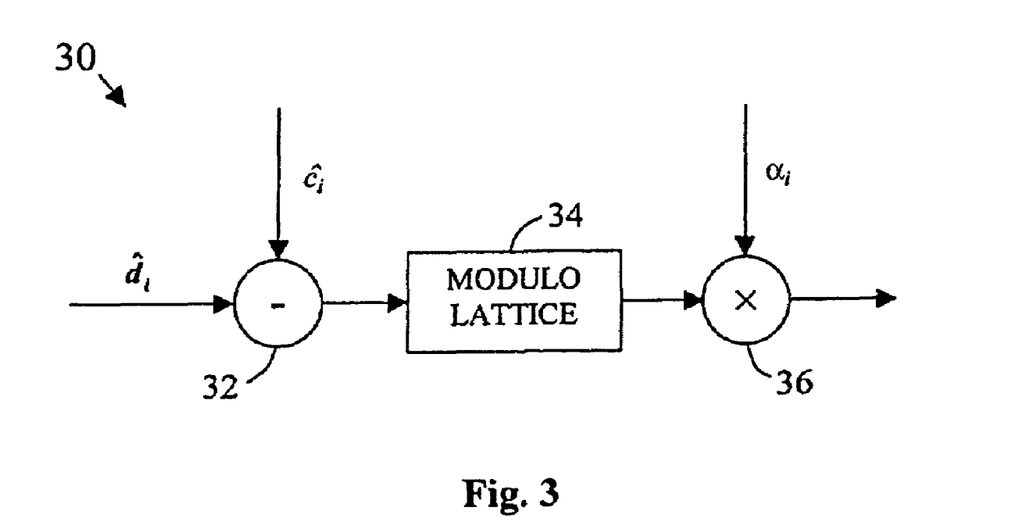
FIG. 3 is a block diagram illustrating an example transmit signal generator in accordance with an embodiment of the present invention.

FIG. 3 is a block diagram illustrating an example transmit signal generator 30 in accordance with an embodiment of the present invention. As shown, the transmit signal generator 30 includes a subtractor 32, a modulo lattice unit 34, and a multiplier 36. For the ith user device, the subtractor 32 calculates a difference between the dedicated transmit symbols $\tilde{d}_i$ and the common channel interference $\hat{c}_i$. The difference is then input into the modulo lattice unit 34 which performs a modulo lattice operation thereon. The multiplier 36 then multiplies the output of the modulo lattice unit 34 by the constant $\alpha_i$. The resulting transmit signal may then be modulated and transmitted to the ith user device via the corresponding dedicated channel. A similar arrangement may be used to generate one or more transmit signals for each user device of interest. After the above-described transmit signal has been transmitted, a signal $y_i$ will be received by ith user device. To recover the dedicated symbols, the ith user device may then perform a modulo lattice operation on the received signal as follows:

$$y_i' = y_i \bmod \Lambda$$

Other methods for recovering the dedicated symbols in the receiver that take into account the structure of the transmission may alternatively be used (e.g., soft output decoding, etc.).

In at least one embodiment of the present invention, linear processing or other types of pre-processing may be performed at the transmitter side (and/or post-processing at the receiver side) in order to put the equivalent channel in the form of equation 1 above. Other channel models may alternatively be used. The above-described procedure represents one approach for applying dirty paper techniques to cancel common channel interference within a wireless system. Many other approaches also exist. In CDMA-based systems, the common channel cancellation may be performed at the chip level or at the symbol level.

Figure 4:
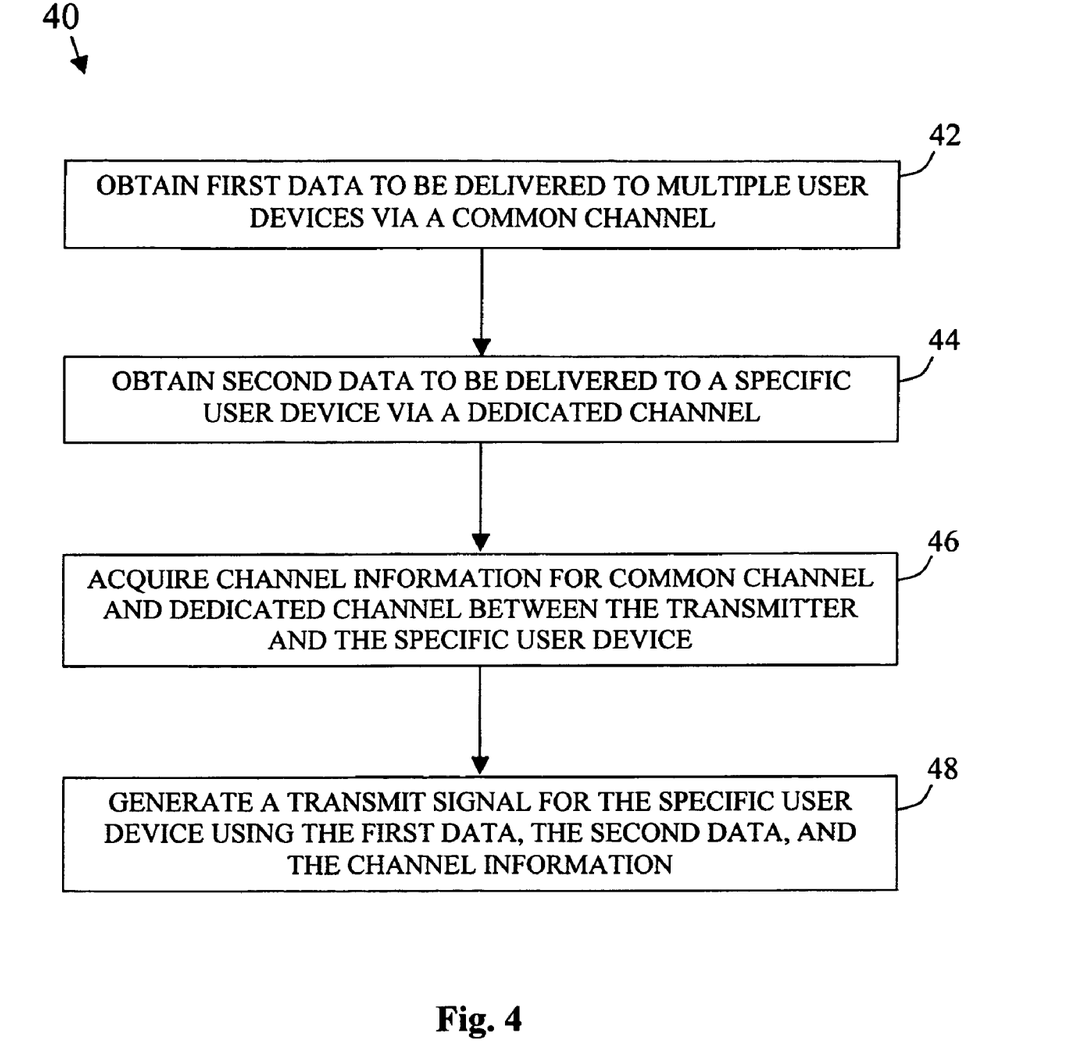
FIG. 4 is a flowchart illustrating an example method for use in performing transmitter-side interference mitigation to cancel or reduce the effect of common channel interference in a receiver in accordance with an embodiment of the present invention.

FIG. 4 is a flowchart illustrating an example method 40 for use in performing transmitter-side interference mitigation to cancel or reduce the effect of common channel interference in a receiver in accordance with an embodiment of the present invention. In a transmitter, first data is obtained that is to be delivered to multiple user devices via a common channel (block 42). In a CDMA-based system, this may include, for example, data to be transmitted to users via a pilot channel, data to be transmitted to users via a paging channel, and/or other types of common channel data. Second data is obtained that is to be delivered to a specific user device via a dedicated channel (block 44). Channel information (e.g., a full or partial channel response, a channel approximation, etc.) is also acquired in the transmitter for a common channel and a dedicated channel between the transmitter and the specific user device (block 46). This channel information may be transmitted to the transmitter from the specific user device. A transmit signal may then be generated for the specific user device using the first data, the second data, and the channel information (block 48). In at least one embodiment, the transmit signal may be generated using Equations 2 and 3 described above. Other techniques for generating the transmit signal may alternatively be used. Transmit signals may be generated for delivery to other user devices in a similar fashion. After the transmitted signal has been received by the corresponding user device, the device may perform a modulo lattice operation on the received signal to recover the second data while effectively canceling the common channel interference. Other methods for recovering the second data in the receiver may alternatively be used (e.g., soft output decoding).

In at least one implementation, an interference-mitigating transmit signal is generated for a user device of interest without using channel information relating to a corresponding dedicated channel. For example, in Equation 3 above, the value of $\alpha_i$ may be calculated without the use of dedicated channel information. By generating such a transmit signal without using channel information for the corresponding dedicated channel, some performance degradation may be experienced. However, there are situations where this performance degradation (if any) may be tolerable.

Figure 5:
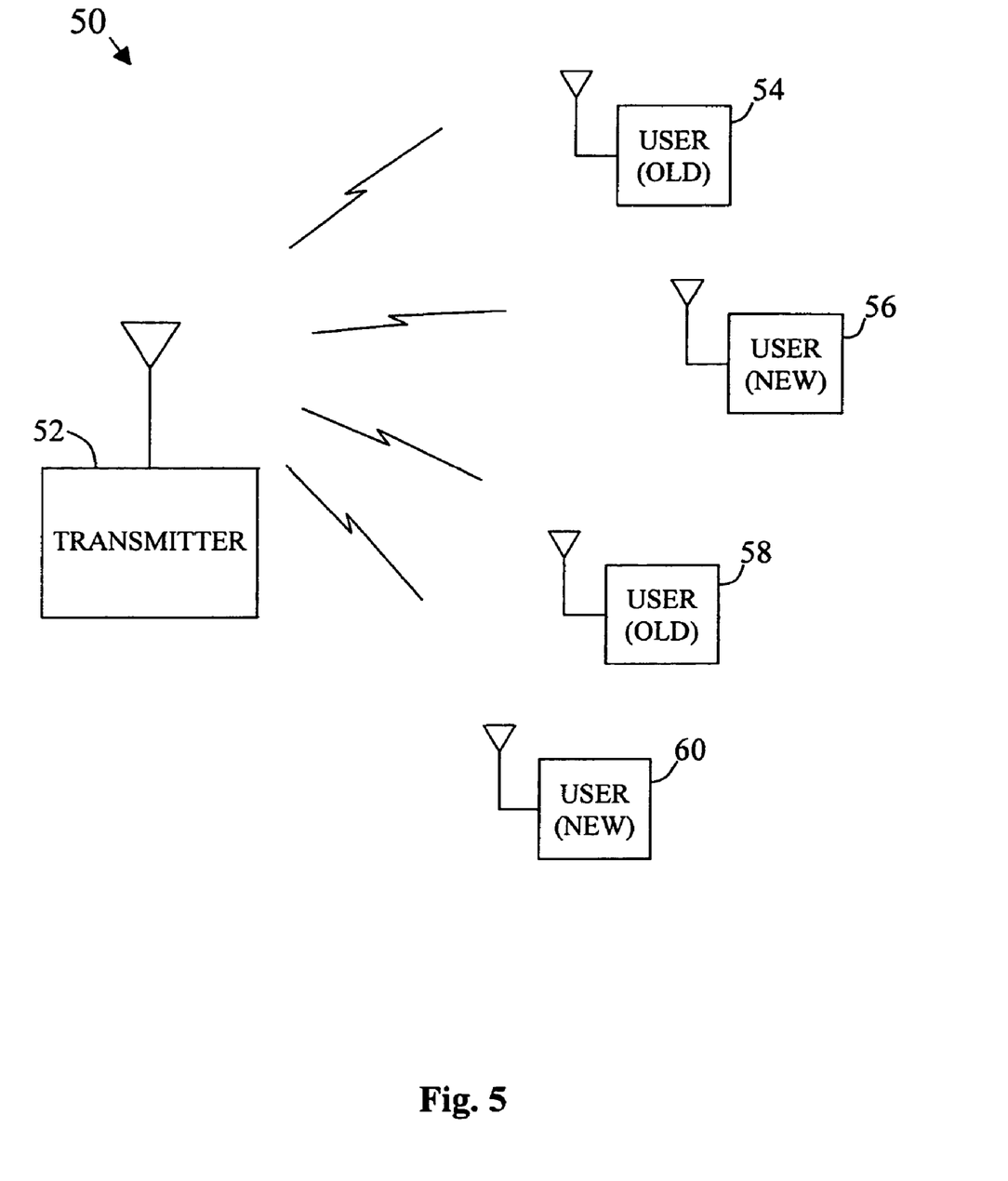
FIG. 5 is a block diagram illustrating an example wireless arrangement that may be used to support multiple classes of users in accordance with an embodiment of the present invention.

In addition to use with common channel interference, dirty paper techniques may also (or alternatively) be used to cancel interference associated with dedicated channels within a system. Furthermore, in at least one aspect of the present invention, structures and techniques may be provided to allow some users within a system to use dirty paper techniques while others do not. This may be useful, for example, to allow a system to support a class of old users (i.e., users having older, legacy equipment) and a class of new users (i.e., users having newer equipment that supports dirty paper style interference cancellation) simultaneously. FIG. 5 is a block diagram illustrating an example wireless arrangement 50 that may be capable of supporting multiple classes of users in accordance with an embodiment of the present invention. As illustrated, the wireless arrangement 50 may include one or more of: a transmitter 52; a number of old class user devices 54, 58; and a number of new class user devices 56, 60. The new class user devices 56, 60 are devices that can use dirty paper style cancellation techniques during operation and the old class user devices 54, 58 are devices that do not use these techniques (e.g., legacy devices). Although the arrangement 50 of FIG. 5 is illustrated with two old devices and two new devices, it should be appreciated that any combination of old and new devices may exist at a particular time within a service region.

During operation, the transmitter 52 may transmit signals to each of the user devices 54, 56, 58, 60 via corresponding dedicated channels. The signals that are transmitted to the new class user devices 56, 60 may be generated using dirty paper cancellation techniques to cancel out interference from the old class user devices and the other new class user devices. The signals that are transmitted to the old class user devices 54, 58 will be generated using traditional techniques (i.e., dirty paper techniques are not used). In one approach, each of the new class users may deliver a channel description $h_i$ to the transmitter 52 (e.g., a vector of channel coefficients describing the downlink channel from the transmitter 52 to the ith user device). This channel information may then be used to assemble a channel matrix H that represents the channel coefficients toward all new class users, as follows:

$$H = \begin{pmatrix} h_1 \\ h_2 \\ \vdots \\ h_k \end{pmatrix}$$

where k represents the number of new class users. The signals received by the new class users (ignoring any old class interference) may then be expressed as:

$$\begin{pmatrix} y_1 \\ y_2 \\ \vdots \\ y_k \end{pmatrix} = H \begin{pmatrix} x_1 \\ x_2 \\ \vdots \\ x_k \end{pmatrix} + \begin{pmatrix} n_1 \\ n_2 \\ \vdots \\ n_k \end{pmatrix}$$

where $y_i$ is the symbol received by the ith new user, $x_i$ is the symbol transmitted to the ith user, and $n_i$ is the noise associated with the ith new user. It should be noted that the k "users" described above may be representative of k symbols associated with less than k actual users. For example, in a CDMA system that uses multi-code transmission, a single user (or user device) may be assigned multiple code signatures. In some scenarios, the k "users" described above may be representative of more than k actual users. For example, time may also play a role in the determination of "users" (e.g., in the case of inter symbol interference, consecutive symbols of the same user may be regarded as symbols of multiple users). Also, code reuse may result in such a scenario. The channel matrix H includes the effects of the spreading sequences used (e.g., the Walsh sequences and scrambling sequences). If old class users are present, the channel toward the new class users may be expressed as:

$$\begin{pmatrix} y_1 \\ y_2 \\ \vdots \\ y_k \end{pmatrix} = H \begin{pmatrix} x_1 + I \\ x_2 + I \\ \vdots \\ x_k + I \end{pmatrix} + \begin{pmatrix} n_1 \\ n_2 \\ \vdots \\ n_k \end{pmatrix}$$

where I represents the transmission to all old class users. In at least one embodiment of the present invention, transmit signals are generated for delivery to new class users (via corresponding dedicated channels) using the channel matrix H, the data that will be transmitted to old class users I, and the data symbols to be transmitted to the new class users (which will be referred to hereinafter as data symbols $v_1, \ldots, v_k$).

Figure 6:
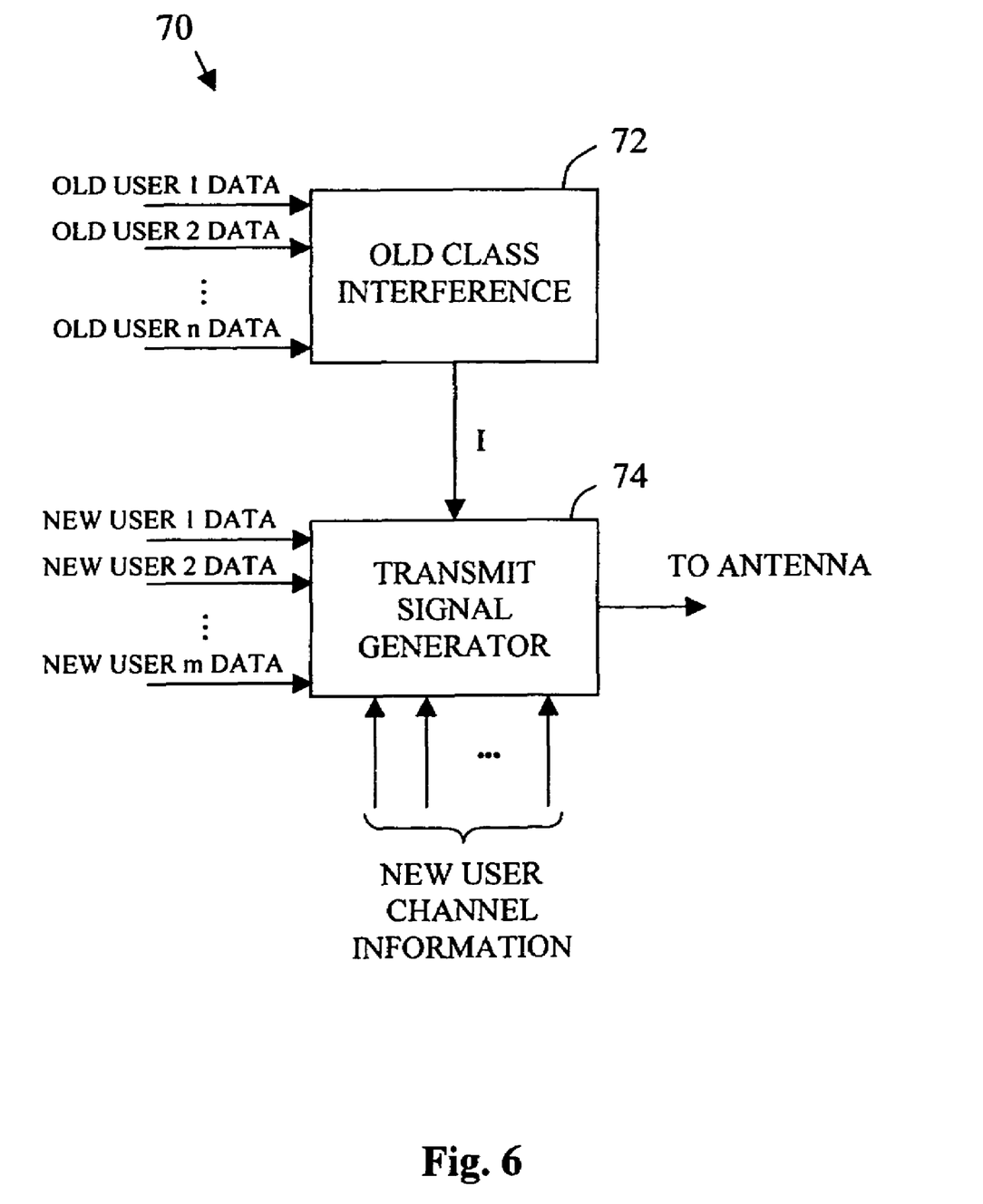
FIG. 6 is a block diagram illustrating a processing arrangement that may be used within a transmitter to generate transmit signals for new class users in an environment that includes both old and new class users in accordance with an embodiment of the present invention.

FIG. 6 is a block diagram illustrating a processing arrangement 70 that may be used within the transmitter 52 to generate one or more transmit signals for new class users. The transmissions to the old class users will be performed as in the past. As shown, the arrangement 70 includes an old class interference unit 72 and a transmit signal generator 74. The old class interference unit 72 is operative for generating an old class interference signal (I) for use by the transmit signal generator 74. In at least one embodiment, the old class interference signal (I) is simply the signal that will be transmitted to the old class users in the legacy manner (i.e., the old class interference unit 72 is the functionality that generates the composite transmit signal for the old class users). The transmit signal generator 74 uses the old class interference signal I along with the data symbols to be transmitted to new class users and the new class user channel response matrix H to generate transmit signals for each of the new class user devices. As described previously, dirty paper cancellation techniques may be used to generate the transmit signals for the new class user devices so that the interference from old class user devices and interference from other new class user devices may be cancelled in the corresponding receivers. As mentioned above, the transmissions to the old class users may be performed in the legacy manner. In at least one embodiment, the use of dirty paper techniques by the new class users will have little or no effect on the demodulation performance of the old class users as the cancellation is performed at the symbol level.

Figure 7:
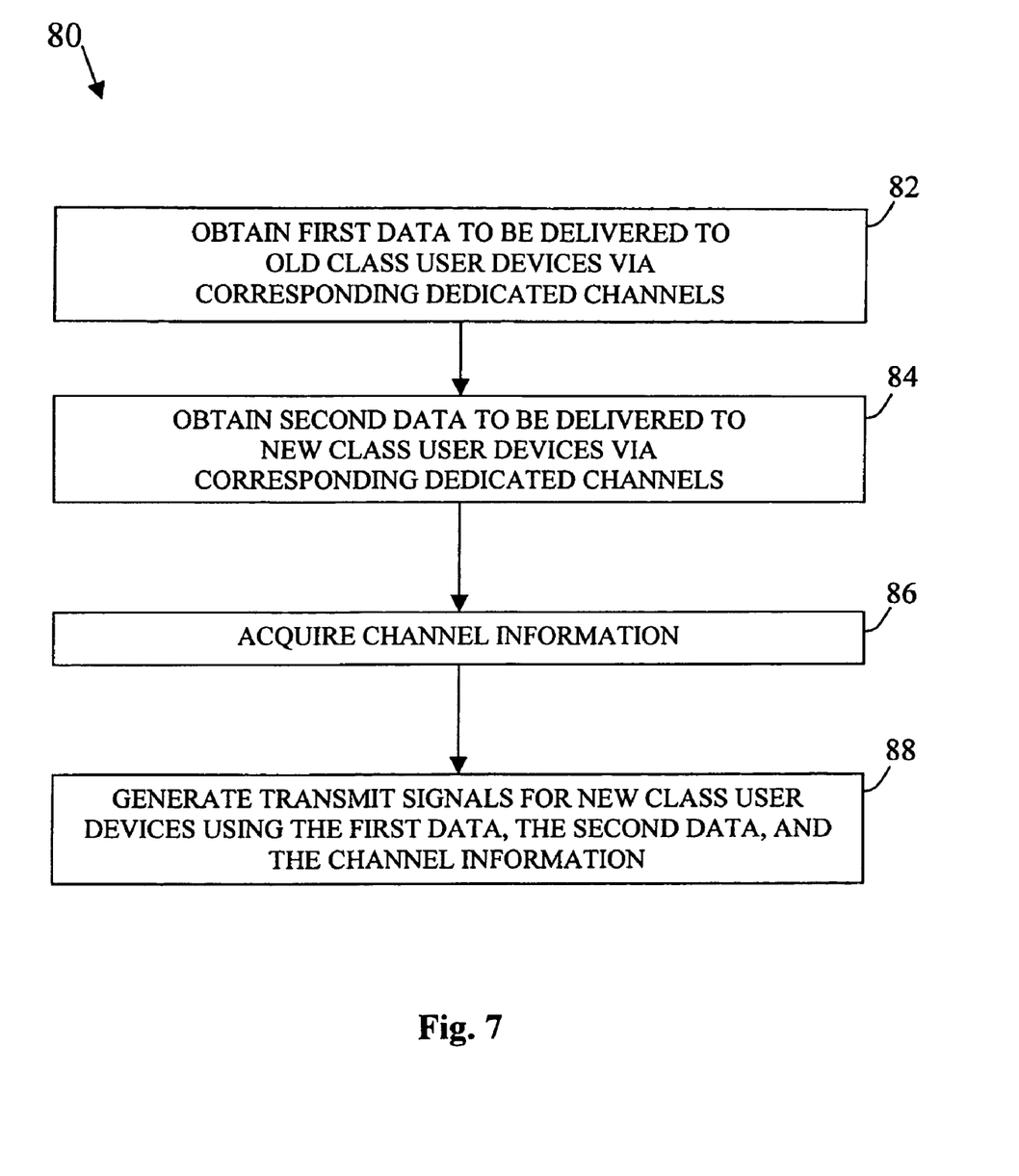
FIG. 7 is a flowchart illustrating an example method for use in performing transmitter-side dedicated channel interference mitigation in a wireless system having both old class users and new class users in accordance with an embodiment of the present invention.

FIG. 7 is a flowchart illustrating an example method 80 for use in performing transmitter-side dedicated channel interference mitigation in a wireless system having both old class users and new class users in accordance with an embodiment of the present invention. First data is obtained that is to be wirelessly transmitted to old class user devices via corresponding dedicated channels (block 82). Second data is also obtained that is to be wirelessly transmitted to new class user devices via corresponding dedicated channels (block 84). In addition, channel information is acquired (block 86). Transmit signals are then generated for the new class user devices using the first data, the second data, and the channel information (block 88). In at least one embodiment, dirty paper techniques are used to generate the transmit signals.

Figure 8:
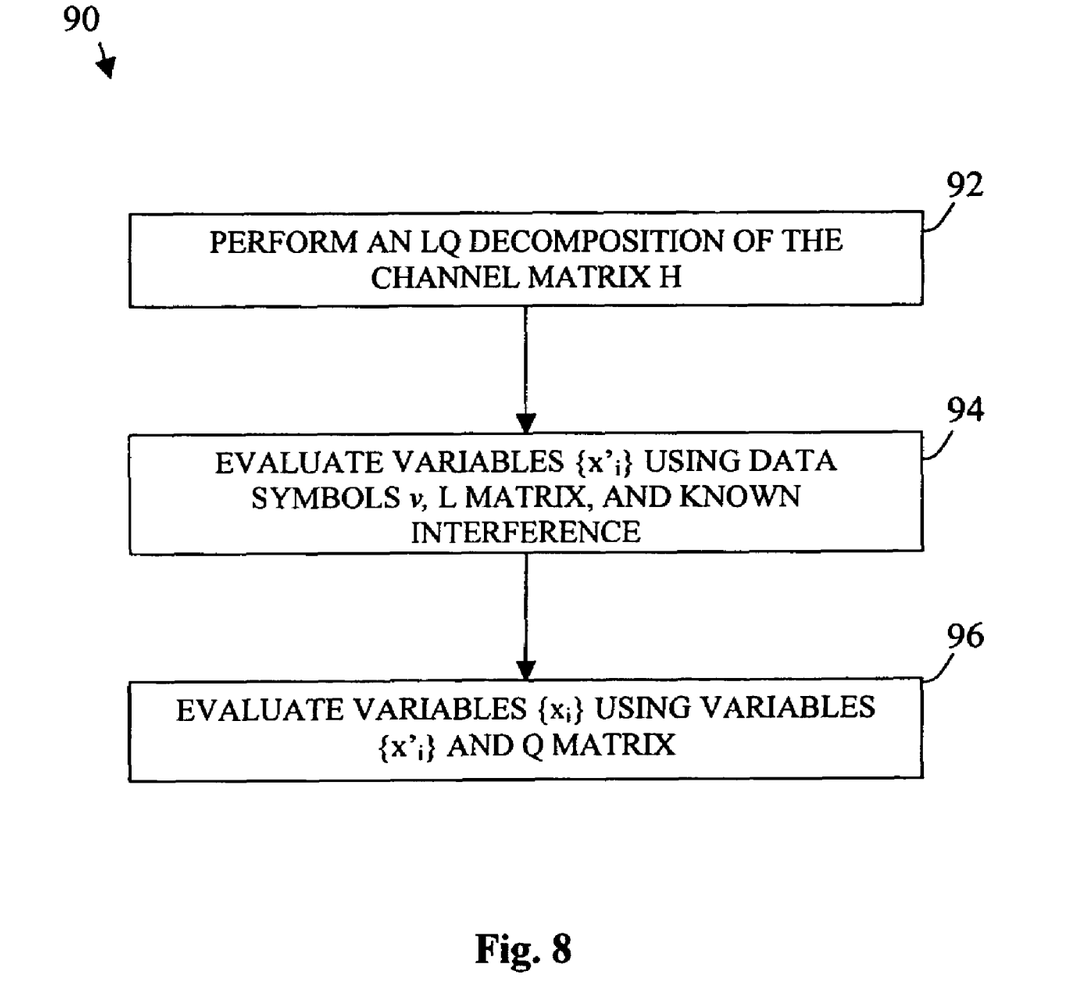
FIG. 8 is a flowchart illustrating an example method for use in generating transmit signals for new class users in an environment that includes both old and new class users in accordance with an embodiment of the present invention.

FIG. 8 is a flowchart illustrating an example method 90 for use in generating transmit signals for new class user devices in a wireless system in accordance with an embodiment of the present invention. The method 90 may be performed, for example, as part of the method 80 of FIG. 7. Other applications also exist. The method 90 is for use in a CDMA-based system and assumes the presence of a linear (or approximately linear) receiver (e.g., a RAKE receiver, etc.) within each user device. The method also assumes that the channel descriptions have been acquired from the new class user devices and assembled into a channel matrix H. The channel descriptions refer to the corresponding channels at the symbol level and therefore include the effects of the corresponding Walsh sequence, scrambling sequence, and RAKE despreading operation. The channel model may be expressed as y=Hx+HI+n. With reference to FIG. 8, an LQ decomposition is first performed on the channel matrix H (block 92). The LQ decomposition is an orthogonal decomposition of the matrix H into a lower triangular matrix (L) and a unitary matrix (O). A description of the use of the LQ decomposition may be found in the paper "On the Achievable Throughout of a Multiantenna Gaussian Broadcast Channel" by Caire et al., IEEE Trans. On Information Theory, Vol. 49, No. 7, pp. 1691-1706, July 2003. Variables $\{x'_i\}$ are next evaluated using the data symbols v, the L matrix, and the known interference (i.e., H·I) (block 94). The data symbols v represent the clean data symbols that are to be transmitted to the new class users. In at least one approach, the variables ($x'_i$) may be evaluated using the following equation:

$$x'_i = \left( v_i - \frac{1}{L_{ii}} \sum_{j<i} L_{ij} x'_j - (HI)_i \right) \bmod \Lambda$$

where $L_{uv}$ is the matrix element in the uth row and the vth column of matrix L and HI is the known interference. The symbols $\{x_i\}$ that will be transmitted to the new class users are next evaluated using the variables $\{x'_i\}$ and the Q matrix (block 96). In one approach, the symbols $\{x_i\}$ are evaluated using the following equation:

$$x = Q^* x'$$

where Q* is the conjugate transpose of matrix Q and x and x' are vectors with components $x_i$ and $x'_i$, respectively. Once the symbols $\{x_i\}$ have been generated, they may be transmitted (along with the ordinary transmission to the old class users) by spreading and scrambling the symbols. When a signal is received by a new class user device, the output of each RAKE finger within the corresponding receiver may be multiplied by an appropriate constant and processed by a modulo lattice operation before being summed with the other finger outputs. Other forms of linear or approximately linear receiver for which the LQ decomposition can be applied may alternatively be used.

It should be appreciated that the principles of the present invention are not limited to application within CDMA based systems. That is, aspects of the invention have application in systems using a wide variety of different multi-user schemes. In addition, although described above in the context of wireless systems, the inventive principles may also be implemented within wired systems (e.g., systems using digital subscriber line (DSL), cable modem, etc.) to reduce the effects of common channel and/or dedicated channel interference. In at least one embodiment of the invention, transmit signals are generated within a transmitter for mitigation of both common channel and dedicated channel interference.

It should be appreciated that the individual blocks illustrated in the block diagrams herein may be functional in nature and do not necessarily correspond to discrete hardware elements. For example, two or more of the blocks within a diagram may be implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   obtaining first data to be delivered to multiple user devices via a common channel;
   obtaining second data to be delivered to a specific user device via a dedicated channel;
   acquiring channel information for a common channel between a transmitter and said specific user device; and
   generating a transmit signal for said specific user device using said first data, said second data, and said channel information, said transmit signal to be transmitted from said transmitter to said specific user device via said dedicated channel, wherein generating said transmit signal includes:
   determining a common channel interference component using said first data and said channel information for said common channel;
   determining a difference between said common channel interference component and said second data;
   performing a modulo lattice operation on said difference; and
   scaling a result of the modulo lattice operation using a power value associated with the specific user device.

2. The method of claim 1, further comprising:
   acquiring channel information for a dedicated channel between said transmitter and said specific user device before generating said transmit signal, wherein generating said transmit signal includes using said channel information for said dedicated channel;
   wherein scaling the result of the modulo lattice operation also uses said channel information for said dedicated channel.

3. The method of claim 1, wherein:
   said transmit signal is configured so that common channel interference will be at least partially cancelled within said specific user device after reception therein.

4. The method of claim 3, wherein:
   said method is for use within a code division multiple access (CDMA) based system; and
   said common channel interference will be at least partially cancelled at the chip level.

5. The method of claim 3, wherein:
   said method is for use within a CDMA based system; and
   said common channel interference will be at least partially cancelled at the symbol level.

6. The method of claim 1, wherein:
   acquiring channel information includes receiving channel information from said specific user device.

7. The method of claim 1, wherein:
   said transmitter is part of a base station in a cellular CDMA system; and
   said first data includes data to be broadcast as part of a pilot signal.

8. The method of claim 1, wherein:
   said transmitter is part of a base station in a cellular CDMA system; and
   said first data includes data to be broadcast as part of a paging signal.

9. The method of claim 1, wherein:
   generating a transmit signal includes using dirty paper cancellation techniques.

10. The method of claim 1, wherein:
    said common channel interference component is an interference component that would be output by a receiver of said specific user device as a result of transmitting said first data from said transmitter into said common channel without using interference mitigation.

11. The method of claim 10 wherein:
    determining said common channel interference component includes determining an effect of the common channel, as given by said channel information, on said first data.

12. The method of claim 1, further comprising:
    transmitting said transmit signal from said transmitter.

13. A communication apparatus comprising:
    a common channel interference unit to determine a common channel interference component associated with a remote user device using known common channel transmit data and corresponding channel information; and
    a transmit signal generator to generate a transmit signal to be transmitted to said remote user device via a dedicated channel, said transmit signal generator using said common channel interference component and dedicated data to generate said transmit signal;
    wherein said transmit signal generator includes:
    a subtractor to generate a difference between said common channel interference component and said dedicated data;
    a modulo lattice unit to perform a modulo lattice operation on said difference; and
    a multiplier to multiply an output of the modulo lattice unit by a scaling value generated based a power value associated with the remote user device.

14. The communication apparatus of claim 13, wherein:
    said transmit signal generator generates said transmit signal using dirty paper cancellation techniques.

15. The communication apparatus of claim 13, wherein the scaling value is generated further based on channel information for said dedicated channel.

16. A system comprising:
    at least one dipole antenna;
    a common channel interference unit to determine a common channel interference component associated with a remote user device using known common channel transmit data and corresponding channel information; and a transmit signal generator to generate a transmit signal to be transmitted to said remote user device via a dedicated channel, said transmit signal generator using said common channel interference component and dedicated data to generate said transmit signal, wherein said transmit signal is transmitted using said at least one dipole antenna;

wherein said transmit signal generator includes:

a subtractor to generate a difference between said common channel interference component and said dedicated data;

a modulo lattice unit to perform a modulo lattice operation on said difference; and a multiplier to multiply an output of the modulo lattice unit by a scaling value generated based a power value associated with the remote user device.

17. The system of claim 16, wherein the scaling value is generated further based on channel information for said dedicated channel.

18. An article comprising a storage medium having instructions stored thereon that, when executed by a computing platform, result in:

obtaining first data to be delivered to multiple user devices via a common channel;

obtaining second data to be delivered to a specific user device via a dedicated channel;

acquiring channel information for a common channel between a transmitter and said specific user device; and generating a transmit signal for said specific user device using said first data, said second data, and said channel information, said transmit signal to be transmitted from said transmitter to said specific user device via said dedicated channel, wherein generating said transmit signal includes:

determining a common channel interference component using said first data and said channel information for said common channel;

determining a difference between said common channel interference component and said second data;

performing a modulo lattice operation on said difference; and scaling a result of the modulo lattice operation using a power value associated with the specific user device.

19. The article of claim 18, wherein said instructions, when executed by the computing platform, further result in:

acquiring a channel information for a dedicated channel between said transmitter and said specific user device before generating said transmit signal, wherein generating said transmit signal includes using said channel information for said dedicated channel;

wherein scaling the result of the modulo lattice operation also uses said channel information for said dedicated channel.

20. The article of claim 18, wherein:

said transmit signal is configured so that common channel interference will be at least partially cancelled within said specific user device after reception therein.

21. The article of claim 18, wherein:

generating a transmit signal includes using dirty paper cancellation techniques.

22. A method comprising:

obtaining first data to be delivered to user devices associated with a first class via corresponding dedicated channels;

obtaining second data to be delivered to user devices associated with a second class via corresponding dedicated channels;

acquiring channel information from user devices associated with said second class;

generating transmit signals to be transmitted to user devices associated with said first class without using dirty paper techniques; and generating transmit signals to be transmitted to user devices associated with said second class using said first data, said second data, and said channel information, wherein generating said transmit signal to be transmitted to user devices associated with said second class includes:

determining a composite interference component based on said first data; and subtracting said composite interference component from said second data.

23. The method of claim 22, wherein:

said first class includes user devices that do not use dirty paper cancellation techniques.

24. The method of claim 22, wherein:

said second class includes user devices that use dirty paper cancellation techniques.

25. The method of claim 22, wherein:

generating transmit signals to be transmitted to user devices associated with said second class includes using dirty paper cancellation techniques.

26. The method of claim 22, wherein:

generating transmit signals to be transmitted to user devices associated with said second class includes generating signals that are configured to cancel interference caused by signals transmitted to user devices associated with said first class.

27. The method of claim 26, wherein:

generating transmit signals to be transmitted to user devices associated with said second class includes generating signals that are configured to cancel interference caused by signals transmitted to user devices associated with said second class.

28. The method of claim 22, wherein:

generating transmit signals to be transmitted to user devices associated with said second class includes performing a decomposition of a channel matrix into a unitary matrix and a triangular matrix.

29. The method of claim 22, wherein:

generating transmit signals to be transmitted to user devices associated with said second class includes performing a modulo lattice operation.

30. A communication apparatus comprising:

an interference unit to collect data to be delivered to user devices within a first class via corresponding dedicated channels and to use the collected data to generate a composite interference signal; and a transmit signal generator to generate transmit signals to be transmitted to user devices associated with said first class without using dirty paper techniques, and to generate transmit signals to be transmitted to user devices within a second class via corresponding dedicated channels using said composite interference signal, dedicated data to be delivered to said user devices within said second class, and channel information associated with said user devices within said second class;

wherein said transmit signal generator is configured to subtract said composite interference component from said second data and to generate said transmit signals to be transmitted to user devices within said second class using said subtraction of said interference component from said second data.

31. The communication apparatus of claim 30, wherein:
said first class includes user devices that do not use dirty paper cancellation techniques.

32. The communication apparatus of claim 30, wherein:
said second class includes user devices that use dirty paper cancellation techniques.

33. The communication apparatus of claim 30, wherein:
said transmit signal generator uses dirty paper cancellation techniques to generate said transmit signals to be transmitted to user devices within said second class.

34. The communication apparatus of claim 30, wherein:
said transmit signal generator includes a modulo lattice unit.

35. The communication apparatus of claim 30, wherein:
said transmit signal generator includes matrix decomposition functionality for decomposing a channel matrix into a unitary matrix and a triangular matrix.

36. A method comprising:
generating at a transmitter, using common channel information, a transmit signal for transmission to a remote user device via a dedicated channel, wherein the transmit signal is pre-configured at the transmitter so that common channel interference is mitigated within said remote user device upon reception; and
transmitting said transmit signal;
wherein generating said transmit signal includes:
  determining a common channel interference component using said channel information for said common channel; and
  determining a difference between said common channel interference component and data to be transmitted to said remote device via said dedicated channel;
  performing a modulo lattice operation on said difference; and
  scaling a result of the modulo lattice operation using a power value associated with the remote user device.

37. The method of claim 36, wherein:
generating a transmit signal includes using dirty paper cancellation techniques.

* * * * *